(12) United States Patent
Wittebrood

(10) Patent No.: US 12,731,833 B2
(45) Date of Patent: Sep. 8, 2026

(54) METHOD FOR MANUFACTURING A STEEL STRIP OR SHEET FOR A BATTERY CASE AND BATTERY CASE MADE THEREFROM

(71) Applicant: TATA STEEL NEDERLAND TECHNOLOGY B.V., Velsen-Noord (NL)

(72) Inventor: Adrianus Jacobus Wittebrood, Castricum (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 625 days.

(21) Appl. No.: 18/262,851

(22) PCT Filed: Jan. 28, 2022

(86) PCT No.: PCT/EP2022/051998

§ 371 (c)(1),
(2) Date: Jul. 25, 2023

(87) PCT Pub. No.: WO2022/162120

PCT Pub. Date: Aug. 4, 2022

(65) Prior Publication Data

US 2024/0088487 A1 Mar. 14, 2024

(30) Foreign Application Priority Data

Jan. 28, 2021 (EP) .................................... 21153906

(51) Int. Cl.

*H01M 50/119* (2021.01)
*H01M 50/124* (2021.01)
*H01M 50/128* (2021.01)

(52) U.S. Cl.

CPC ....... *H01M 50/119* (2021.01); *H01M 50/124* (2021.01); *H01M 50/1243* (2021.01); *H01M 50/1245* (2021.01); *H01M 50/128* (2021.01)

(58) Field of Classification Search

CPC ............. H01M 50/116; H01M 50/117; H01M 50/119; H01M 50/124; H01M 50/1243; H01M 50/1245

See application file for complete search history.

(56) References Cited

U.S. PATENT DOCUMENTS 10,164,220 B1 * 12/2018 Lim .......................... B32B 3/00
10,218,033 B1 * 2/2019 Bhardwaj ........... H01M 50/121
2019/0024230 A1 * 1/2019 Shivareddy ............. C23C 16/26
2021/0074653 A1 * 3/2021 Trifunovic ............ H10W 42/00

(Continued)

FOREIGN PATENT DOCUMENTS

CN 107910462 A 4/2018
EP 3071519 A1 9/2016

(Continued)

OTHER PUBLICATIONS

International Search Report and Written Opinion mailed May 11, 2022 for PCT/EP2022/051998 to Tata Steel Nederland Technology B.V. filed Jan. 28, 2022.

*Primary Examiner* — Imran Akram

(74) *Attorney, Agent, or Firm* — Vorys, Sater, Seymour and Pease LLP; Maryellen Feehery Hank

(57) ABSTRACT

A method for manufacturing a steel sheet for a battery, a steel sheet for a battery case as well as to a battery case made therefrom.

20 Claims, 6 Drawing Sheets

(56) References Cited

U.S. PATENT DOCUMENTS

Figure 2:
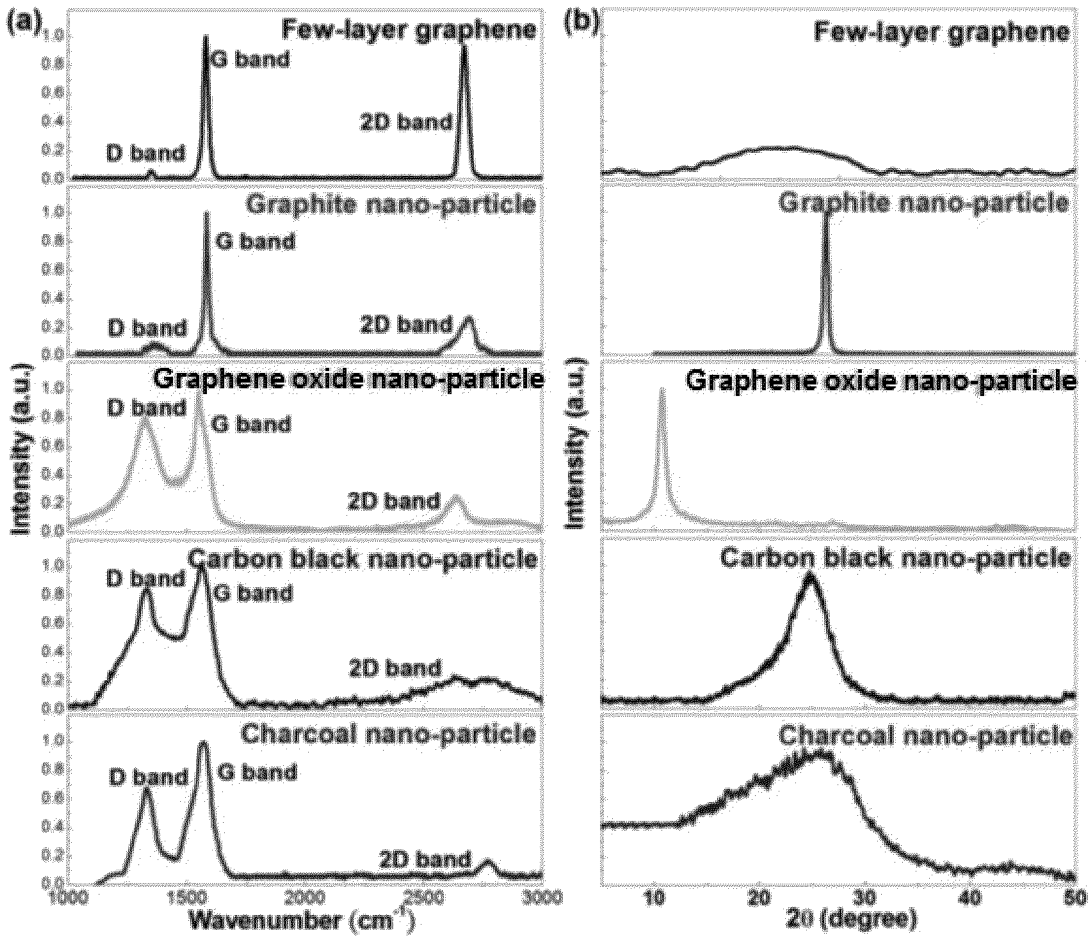

2021/0234218 A1* 7/2021 Kwon ................. H01M 50/184
2022/0403539 A1* 12/2022 Goto ..................... B32B 15/013

FOREIGN PATENT DOCUMENTS

EP 3426817 A1 1/2019
WO 2013191347 A1 12/2013
WO 2015074752 A1 5/2015
WO 2017153254 A1 9/2017

* cited by examiner

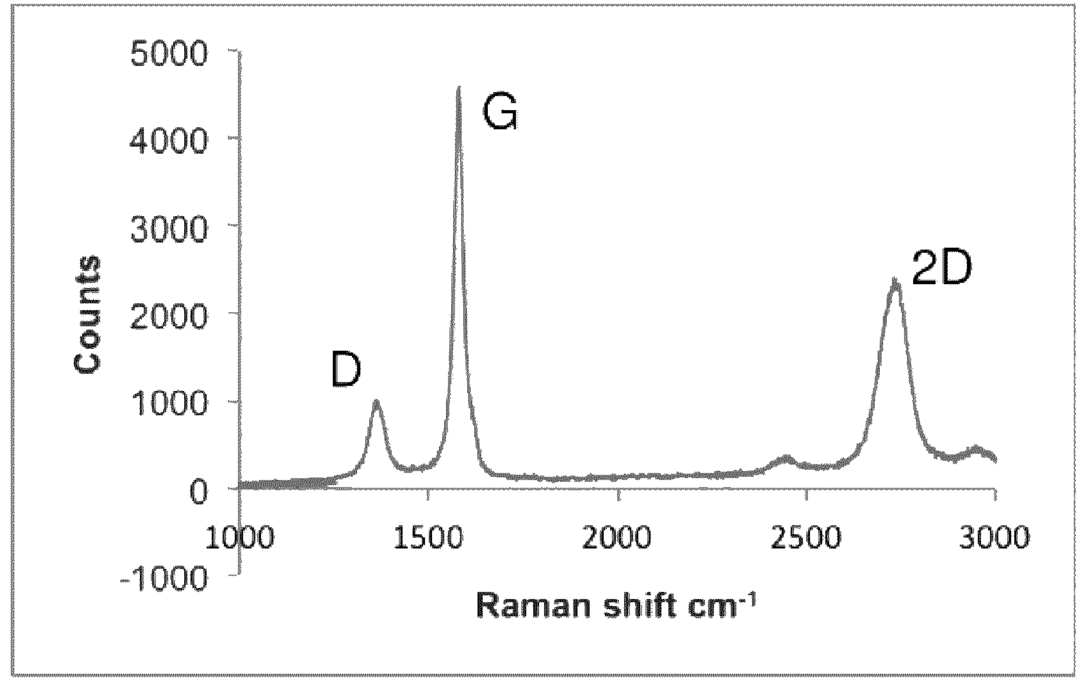
(a)
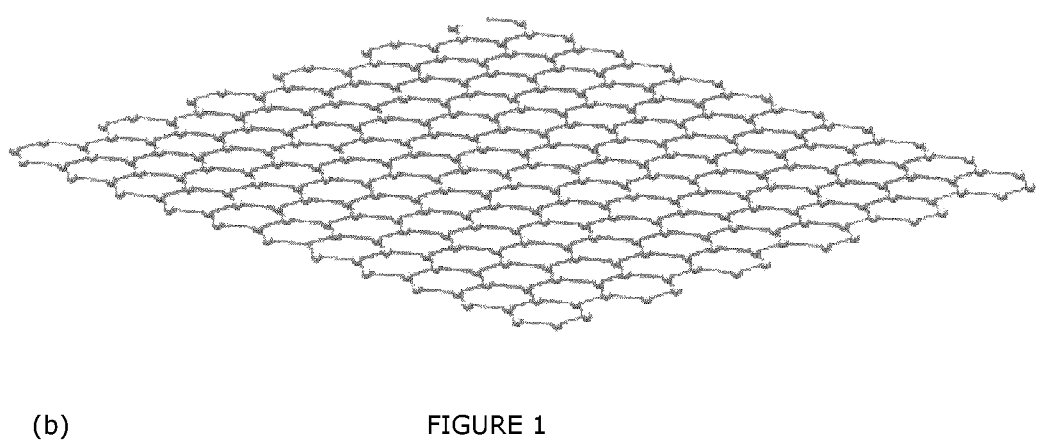
(b) FIGURE 1

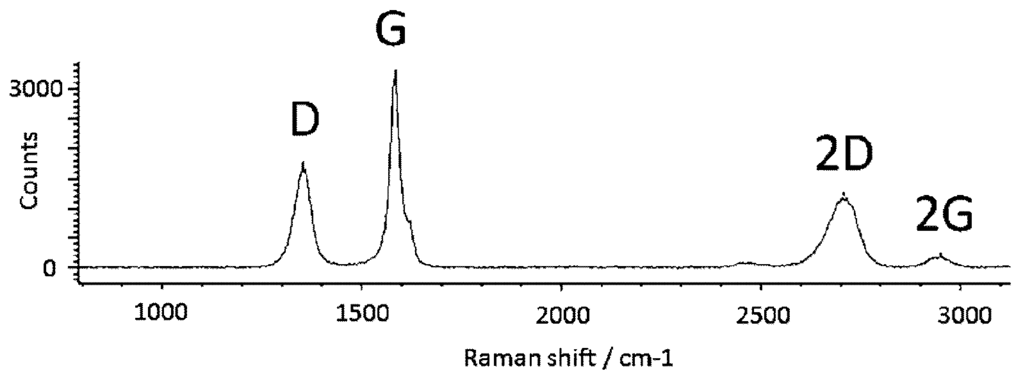
(a)
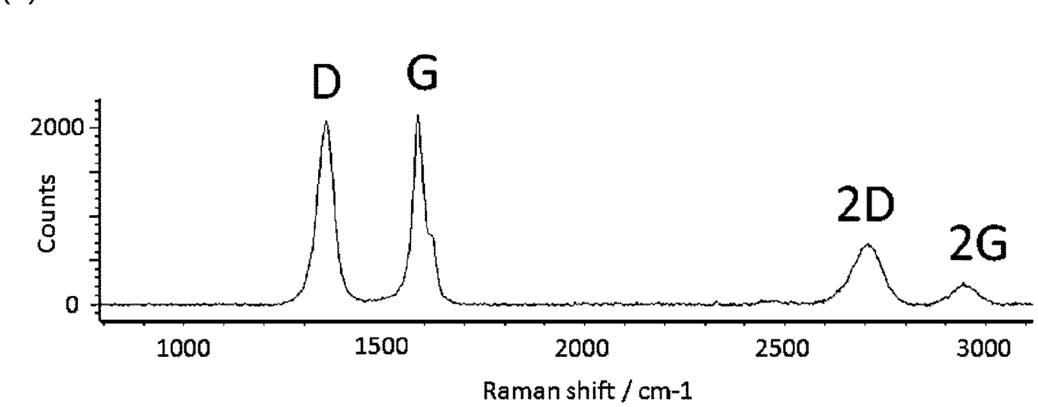
(b)
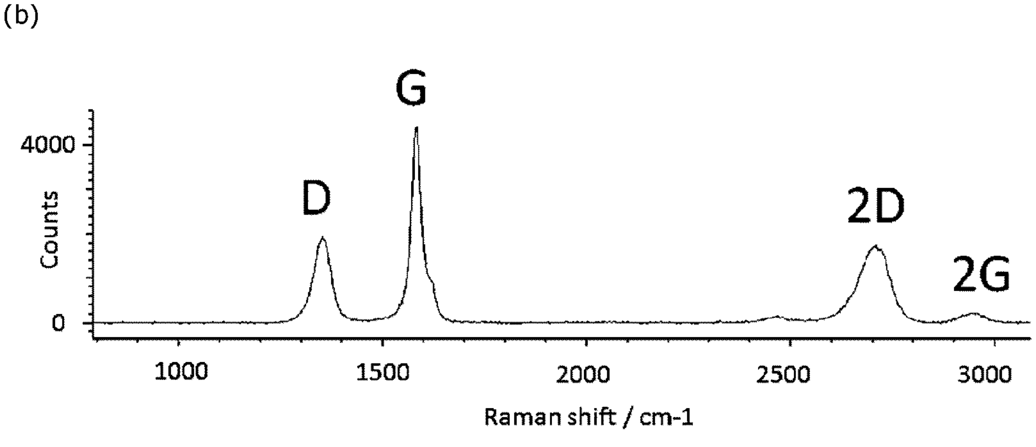
(c)
FIGURE 3

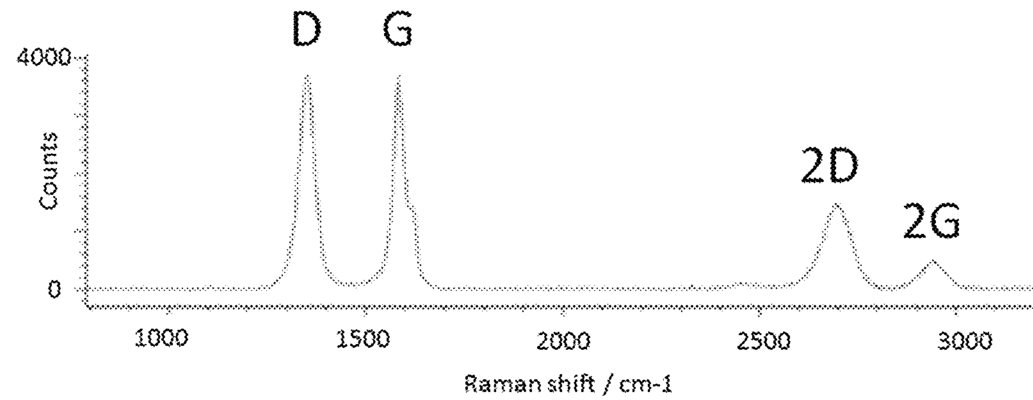
(d)
FIGURE 3
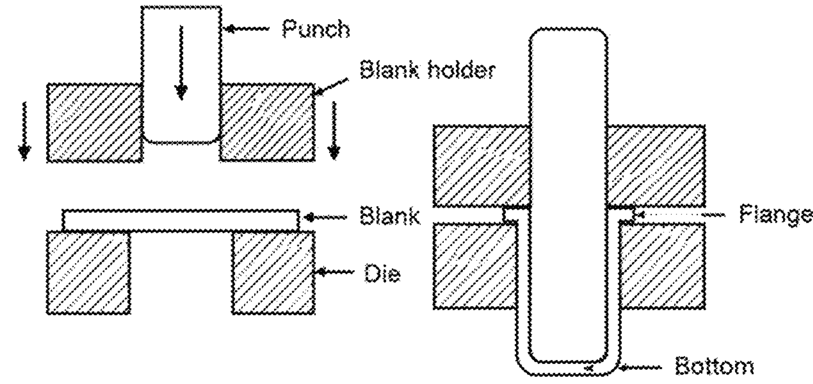
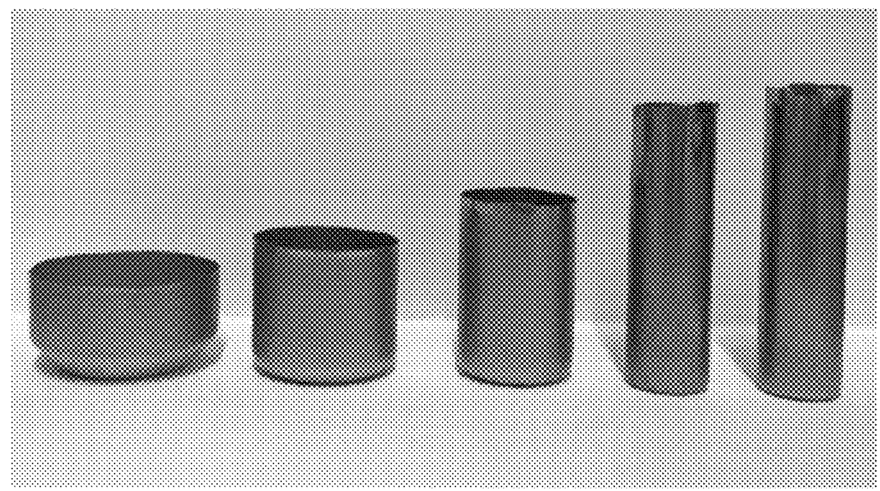
FIGURE 4

METHOD FOR MANUFACTURING A STEEL STRIP OR SHEET FOR A BATTERY CASE AND BATTERY CASE MADE THEREFROM

CROSS-REFERENCE TO RELATED APPLICATIONS

This is a § 371 National Stage Application of International Application No. PCT/EP2022/051998 filed on Jan. 28, 2022, claiming the priority of European Patent Application No. 21153906.9 filed on Jan. 28, 2021.

FIELD OF THE INVENTION

The invention relates to a method for manufacturing a steel sheet for a battery, a steel sheet for a battery case as well as to a battery case made therefrom.

BACKGROUND OF THE INVENTION

Nickel plated steel strip is widely used in the production of battery cases for primary and secondary batteries. Nickel is typically electroplated onto mild steel strip in a continuous process, then annealed and temper rolled to get the desired mechanical and electrical properties for application in batteries. The electrical properties are important because the nickel-plated battery can acts as a current collector electrode.

Sometimes cobalt and graphite are electroplated or co-deposited to improve the performance by reducing the resistance in the battery along with better electrochemical stability preventing corrosion of the underlying low carbon steel. However, there are few issues regarding these coatings:

- nickel is prone to form semiconducting nickel hydroxide layer (β-Ni$(OH)_2$) or insulating nickel oxide in presence of alkaline solution present in primary alkaline batteries which reduces the conductivity of nickel and also the presence of this insulating layer causes 'ageing' of primary alkaline batteries;
- the addition of some transition metals like cobalt to nickel coated steel improves the conductivity, decreases the internal resistance and decreases the aging effect as cobalt oxide is more stable and more conducting that nickel oxides. However these metals are expensive and could be toxic. Presence of high concentration of toxic heavy metal ions requires special care during battery disposal, and
- the process of battery canmaking involves deep drawing and a wet lubricant is essential for this process. After the deep drawing the battery case has to be cleaned with an alkaline solution to remove the lubricant that was used, which is an extra step which bring further costs.

Another solution to lower the internal resistance of batteries is the application of a conducting graphitic paint once the battery can is made. The graphite on the can provides a better interface to the metal current collector than the bare metal electrode in the battery.

Although the battery performs better with the graphite paint than in its absence, the graphite coating inside the battery can is not uniformly coated on the inside surface. This is due to the nature of the spraying process where the spray does not reach the surface at the bottom of the can due to its cylindrical geometry. This process is also not very efficient in terms of the amount of graphite material used due to spillage outside the battery can and down time due to clogging of the spray nozzle with the graphite particles present in the paint.

Graphite coatings, despite their value for the performance, pose a risk to batteries as well. Due to the relatively poor adhesion, the coating should not be found in the closing area of the can to prevent leakage. This means every single can is inspected.

Also there is a risk that the coating is not uniform, applied in too high or too low a volume which all can lead to other performance issues in the cell. Therefore, although it is the current industry standard, it is not the most reliable solution.

Objectives of the Invention

It is an objective of the present invention to provide a steel sheet or steel strip for a battery case with an improved conductivity.

It is another objective of the present invention to provide a steel sheet or steel strip for a battery case with decreased contact resistance.

It is another objective of the present invention to provide to provide a steel sheet or steel strip for a battery case with an increased corrosion resistance.

It is another objective of the present invention to provide to provide a steel sheet or steel strip for a battery case with a coating with reduced thickness.

It is another objective to provide a steel sheet or steel strip for a battery case wherein any additional coating layers such as cobalt and graphite coating layers are no longer required.

It is still another objective of the present invention to provide a method to cost effectively apply a graphene coating on a steel sheet or steel strip.

DESCRIPTION OF THE INVENTION

According to a first aspect of the invention one or more of the objectives of the invention are realized by the method for manufacturing a steel strip for a battery case, wherein the method comprises:

- providing a Ni-plated steel strip, and
- applying a graphene coating layer on one or both sides of the Ni-plated steel strip, characterised in that
- the method of applying the graphene coating on the Ni-plated steel strip consists of a continuous roll-to-roll process, wherein the process is operated fully continuously by joining the leading edge of a coil of Ni-plated steel strip to the trailing edge of the preceding coil of Ni-plated steel strip in a joining section before entering the step of fast heating of the Ni-plated steel strip and separating the Ni-plated steel strip after cooling the graphene coated Ni-plated steel strip to produce coils of graphene coated Ni-plated steel strips, comprising the following consecutive steps:
  - fast heating at a heating rate of at least 50° C./s of the Ni-plated steel strip in an inert, non-oxidising or reducing atmosphere in a heating section to a heat soak temperature of between 400 to 850° C.;
  - holding the Ni-plated steel strip in the heat soak section at the heat soak temperature;
  - projecting an inert, non-oxidising or reducing gas carrier comprising a graphene precursor on the heated Ni-plated steel strip in the heat soak section to produce an adhering graphene coating layer on the Ni-plated steel strip wherein the deposition growth time for the graphene coating layer is in the range of 0.10 seconds to 60 seconds;

cooling the graphene coated Ni-plated steel strip in a cooling section wherein the cooling medium is inert or reducing with respect to graphene;

post-processing the graphene coated Ni-plated steel strip.

It is preferable to heat the Ni-plated steel strip quickly to the heat soak temperature. Induction heating technology is very suitable to achieve this. It is preferable that the heating rate is at least 75° C./s and more preferably at least 100° C./s.

In an embodiment the graphene coating layer on the graphene coated Ni-plated steel strip sheet has a peak height ratio G/D>1 wherein D and G correspond to the peaks at in the Raman spectrum at around 1365 cm-1 and 1584 cm-1 respectively.

Graphene is an allotrope of carbon consisting of a single layer of atoms arranged in a two-dimensional honeycomb lattice. The graphene in the graphene coating according to the invention comprises one or more layers of graphene, preferably not more than 20 layers and the graphene coating may further comprise amorphous or crystalline sp2 hybridized carbon or mixtures thereof.

Graphene is electrochemically stable in an alkaline environment and also provides passivation of the nickel surface preventing the formation of nickel oxide. It provides a low contact resistance with the cathode mix which in alkaline batteries is a mixture of graphite and manganese oxide. The graphene layer on the nickel-plated steel is also a solid-state lubricant hence the surface of nickel-plated steel provides a degree of self-lubrication for processes like deep drawing (drawing, redrawing and wall ironing) and forming.

Prior art solutions applied graphene coating layers by applying a solvent based graphene coating layer by coil coating, spraying, bar coating and like methods. To this end the graphene coating layer comprises a coupling agent to couple the graphene to the steel sheet or steel strip. Such a coupling agent is for instance an organofunctional silane or an organofunctional siloxane.

However, according to the invention the graphene coating layer is applied by chemical vapour deposition (abbreviated CVD or graphene deposition). With graphene deposition a good adhesion between the graphene coating and the steel sheet or strip is obtained which is due to the van der Waals interaction. The advantage of using graphene deposition for depositing the graphene coating layer is that a very low contact resistance is obtained. The graphene coated Ni-plated steel strip as-coated preferably has an ICR of at most 20 mΩ·cm$^2$, more preferably at most 10 mΩ·cm$^2$, and even more preferably between 0.1-10 mΩ·cm$^2$. Such a low contact resistance cannot be obtained when a solvent based graphene coating is applied on the steel sheet or strip. Moreover the coil-to-coil process enables a high productivity and production rate. Measurements of ICR on a graphene coated Ni-plated steel strip revealed an ICR of 4.0 mΩ·cm$^2$ or below. Similar measurements to the Ni-plated steel strip without graphene coating of 8.2 mΩ·cm$^2$ or below, which is twice as high. And most importantly, after forming a battery case the ICR of the graphene coated Ni-plated steel stays very low as will be shown below.

In an embodiment the inert, non-oxidising or reducing gas carrier comprises the graphene precursor and hydrogen, wherein the concentration levels of hydrogen is in the range of 1.0% to 5.0% hydrogen, preferably in the range of 1.3%-3.5% hydrogen.

All percentages in relation to gas composition in this specification are in volume percent (vol. %).

In another embodiment the inert, non-oxidising or reducing gas comprises the graphene precursor and nitrogen.

In still another embodiment, the inert, non-oxidising or reducing gas comprises the graphene precursor, hydrogen and nitrogen.

To enable the method according to the invention to be operated in a roll-to-roll process (i.e. coils of metal strip can be processed one after the other in a compact and continuous fashion, and not in a batch type fashion) the Ni-plated steel strip is heated quickly, preferably in a non-oxidising, an inert or a reducing atmosphere in a heating section to a heat soak temperature, holding the Ni-plated steel strip in the heat soak section at that heat soak temperature and projecting a precursor gas comprising a graphene precursor and optionally hydrogen and/or nitrogen on the heated Ni-plated steel strip in the heat soak section to produce an adhering graphene coating layer on the Ni-plated steel strip wherein the deposition growth time for the graphene coating layer is in the range of 0.10 to 60 seconds. After that the graphene coated Ni-plated steel strip is cooled down in a cooling section and subsequently post-processed.

The joining of a coil of steel to a subsequent coil of steel requires a fast joining process, such as a laser welding process, and will also require a steel strip accumulator such as a looper tower which is designed to accumulate steel strip prior to further processing. Because the process is continuous, it's necessary to weld individual sheets together as they are fed into the tower. A similar device may be needed at the exit of the process, although a flying shear on a coiler could also be used.

The process is operated fully continuously by joining the leading edge of a coil of Ni-plated steel strip to the trailing edge of the preceding coil of Ni-plated steel strip in a joining section before entering the step of fast heating of the Ni-plated steel strip and separating the Ni-plated steel strip after cooling the graphene coated Ni-plated steel strip. This way the Ni-plated steel strips can be supplied as coils to the process and result as coils of graphene coated Ni-plated steel strips, making the process both more economical and easier to control as the graphene deposition process can be operated continually without interruption.

The graphene precursor in the precursor gas used in the method is one or more gases or vapours from the group of acetylene, methane, ethylene, propa-2-one (($CH_3$—CO—$CH_3$), buta-2-one ($CH_3$—CO—$CH_2$—$CH_3$) and ethyl acetate ($CH_3$—COO—$CH_2$—$CH_3$) gas or vapour. The gas or vapour can be injected directly into the heat soak section, optionally with a carrier gas into the enclosure. A gas refers to a substance that has a single defined thermodynamic state at (e.g.) room temperature whereas a vapour refers to a substance that is a mixture of two phases at (e.g.) room temperature, namely gaseous and liquid phase. The vapour to be injected into the heat soak section can be produced by heating a liquid such as buta-2-one and leading away the vapour above the liquid. For this purpose commercially available evaporation systems can be used.

Whether or not the substance is a gas or a vapour therefore depends on the temperature. Argon or another inert gas could be used as a carrier gas.

In the invention the Ni-plated steel sheet or strip is heated in the heating section to a heat soak temperature of in the range of 400-850° C., but it is preferable that the heat soak temperature is at least 500° C. and more preferably in the range of 600 to 750° C. At these temperatures the graphene forming takes place in the short time consistent with a compact and continuous process. These temperature ranges are also suitable for the annealing process of the cold-rolled Ni-plated steel strip, thus allowing the combination of continuous recrystallisation or recovery annealing of the cold rolled steel and the simultaneous deposition of the graphene coating. The continuous recrystallisation or recovery annealing also ensures that a Fe—Ni diffusion layer is formed in the Ni-plated steel sheet or strip to obtain the desired electrical properties, such as a lower internal resistance. Operating the line at the lower heat soak temperatures of below 500 or 600° C. leads to a lower graphene forming speed and, although practically feasible, be economically and technically (from the viewpoint of the annealing process and the formation of the Fe—Ni diffusion layer) less attractive.

In an alternative embodiment the annealing of the cold-rolled substrate and the deposition of the graphene are separated. This means that the annealing and the graphene deposition does no take place at the same time, so that both processes can be optimised independently. In that case the Ni-plated steel sheet or strip is heated in the heating section to a heat soak temperature of in the range of 400-850° C., but preferably of at least 500° C. and more preferably in the range of 600 to 750° C. for the graphene deposition. The heat treatment of the cold-rolled Ni-plated steel sheet or strip can be chosen and optimised independently, even though the temperature ranges will most likely also be in the range of 400-850° C., but preferably of at least 500° C. and more preferably in the range of 600 to 750° C. for the graphene deposition.

The concentration of reactive gases or vapours used in the process is at very low level. The maximum concentration for a pre-cursor that is a liquid at ambient temperatures and pressures is the vapour pressure under those conditions.

As the precursor gas or vapour is diluted with the inert, non-oxidising or reducing gas carrier, the concentration of the graphene precursor in the projected gas stream is lowered as well.

In an embodiment the graphene precursor is acetylene, and wherein the concentration levels of acetylene in the precursor gas is in the range of 0.05% to 2.5% acetylene or, more preferably in the range of 0.65-1.7% acetylene.

In an embodiment the graphene precursor is propa-2-one, and wherein the concentration levels of propa-2-one in the precursor gas is between 0.05 to 1 times the maximum vapour pressure of propa-2-one at ambient temperature, preferably 0.05% to 2.5% propa-2-one or, more preferably in the range of 0.65-1.7% propa-2-one.

The method according to one or more of claims 1 to 5, wherein the graphene precursor is acetylene, and wherein the concentration levels of buta-2-one in the precursor gas is between 0.05 to 1 times the maximum vapour pressure of buta-2-one at ambient temperature, preferably 0.05% to 2.5% buta-2-one or, more preferably in the range of 0.65-1.7%. buta-2-one.

The method according to one or more of claims 1 to 5, wherein the graphene precursor is ethyl acetate wherein the concentration levels of ethyl acetate in the precursor gas is between 0.05 to 1 times the maximum vapour pressure of ethyl acetate at ambient temperature, preferably 0.05% to 2.5% ethyl acetate or, more preferably in the range of 0.65-1.7% ethyl acetate.

With these concentration levels as described herein above the mixture of reactive gases remains below the explosion limit for the graphene precursors referred to. A high-quality graphene coatings can be deposited under these concentration levels. This also supports the continuous production of graphene coated steel sheet or strip at lower level of consumables.

In order to prevent oxidation of the Ni-plated steel sheet or strip the atmosphere in the enclosure may comprise an inert gas, such as nitrogen, or a non-oxidising or reducing gas such as the mixture of hydrogen and nitrogen or a mixture of hydrogen and another inert gas. In an embodiment of the invention wherein the atmosphere in the heating section or in the heat soak section, or in the heating section and in the heat soak section is an HNX-atmosphere (nitrogen gas with up to 5% hydrogen).

Many graphene deposition processes are carried out under vacuum conditions in order to reduce unwanted gas-phase reactions and to improve uniformity of the deposited layers. A vacuum, even at low vacuum ranges, requires a set-up with specific vacuum pump systems and vacuum locks, which would complicate the method to a great degree and would not be economically viable. However, very good results were realized by applying the graphene coating layer at a pressure in a near atmospheric pressure range of 0.7 to 2.0 bar in the enclosure. With such a near atmospheric pressure range the method can easily be integrated with existing annealing furnaces. So according to another embodiment the method comprises that in the heating section and/or in the heat soak section a pressure is maintained in a near atmospheric pressure range of 0.7 to 2.0 bar. Preferably the pressure range is between 0.8 and 1.2 bar. A pressure slightly above atmospheric pressure should avoid any oxygen seeping into the reaction chamber.

The cooling and cooling rate after the deposition of the graphene is important. As soon as the graphene coated Ni-plated steel strip emerges from the protective atmosphere in the furnace to an oxygen containing atmosphere, the formed graphene will oxidize (burn off) because the strip is still hot. Also, if the graphene coating is cooled with an oxidising medium, such as normal water, then the graphene may oxidise and potentially burn off completely. Therefore the cooling medium must be inert or reducing with respect to graphene. Preferably a closed loop cooling system is used. The cooling medium preferably is oxygen free water. Preferably the cooling water in is saturated with HNX (5% hydrogen, 95% nitrogen) or saturated with another compound having a similar non-oxidising cooling effect.

The cooling rate must be sufficiently high to achieve the desired mechanical properties of the graphene coated Ni-plated steel strip, and not too high to prevent buckling of the strip. Tuning the cooling rate and application of the cooling medium to the strip to be cooled to achieve the desired result and prevent the buckling is common technology in the art and well within the scope of the skilled persons abilities. The cooling rate must also be sufficiently high to prevent the graphene layer from oxidation. Preferably the cooling rate is at least 100° C./s.

Preferably the method according to the invention is fully continuous wherein the leading edge of a coil of Ni-plated steel strip is joined to the trailing edge of the preceding coil of Ni-plated steel strip in a joining section before the fast heating of the Ni-plated steel strip and separating the graphene coated Ni-plated steel strip after the cooling section as part of the post-processing of the graphene coated Ni-plated steel strip. In that respect a roll-to-roll (or coil-by-coil) process becomes a fully continuous process.

The post-processing of the graphene coated Ni-plated steel strip may comprise blowing excess fluid off the strip by an air-knife after cooling the graphene coated Ni-plated steel strip and/or drying the strip in air at a temperature of between 40 and 80° C. and/or temper rolling the graphene coated Ni-plated steel strip, preferably at a reduction of at least 0.1%, and preferably at most 3.0%, more preferably 2.5% or 2.0%. The post-processing may also comprise cutting the strip into sheets or stamping blanks from the strip or sheet and forming a battery case from said sheets or blanks. These post-processing have no operational dependency and can be selected independent of each other if and when deemed appropriate.

In an embodiment the Ni-plated steel sheet or strip is provided on the side of the sheet corresponding with the inner surface of the battery case with Ni-plating layer and optionally a Co coating layer on the Ni-plating layer which is subsequently provided with the graphene coating layer, and a Ni-plating layer and on the opposite side. Without the optional Co coating layer a better interfacial resistance between the graphene coating layer and the Ni-plating layer can be realized than between a Ni-plating layer and a Co coating layer.

According to the invention the deposition growth time for the graphene coating layer on steel sheet or strip is in the range of 0.10 seconds to 60 seconds, and preferably in the range of 0.10 to 20 sec, more preferably at most 10 sec. The inventors found that the deposition growth time for the graphene coating layer on steel sheet or strip can be shorter than 4.0 seconds, resulting in a range for the deposition growth time of 0.10 to 4.0 seconds. This is in particular the case when using propa-2-one or buta-2-one or ethyl acetate as a precursor gas.

Figure 7:
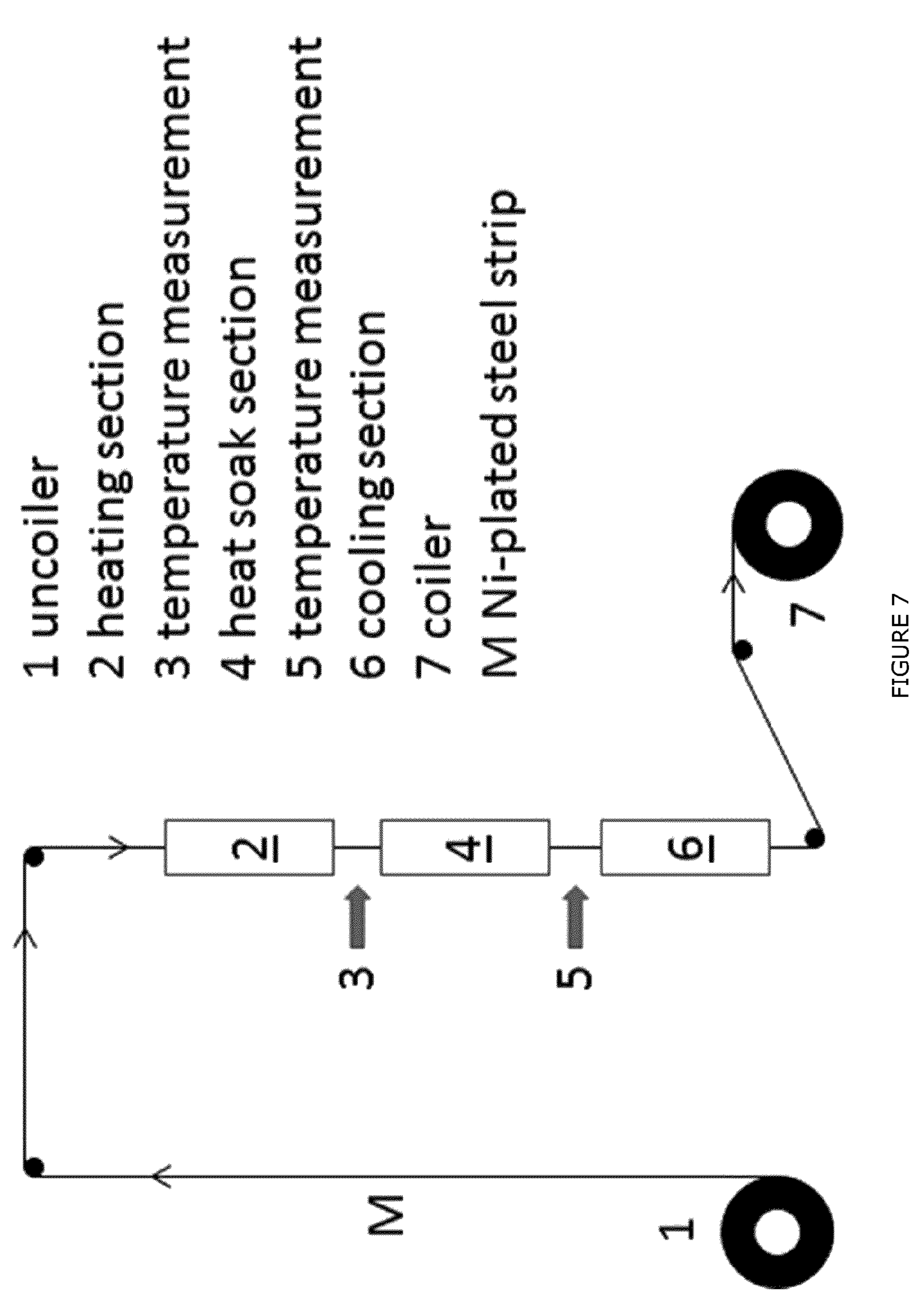

The growth time means the residence time that the steel sheet or strip is in the enclosure and in contact with the reactive gases. The deposition growth time needed to deposit a satisfactory graphene coating layer may be shorter than the time needed for the recrystallisation or recovery of the cold-rolled steel substrate, or the formation of the Fe—Ni diffusion layer. In that case the annealing time in the heat soak section may be chosen longer than the deposition grown time. In an alternative embodiment the annealing of the cold-rolled substrate and the deposition of the graphene are separated. This means that the annealing and the graphene deposition does no take place at the same time, so that both processes can be optimised independently. This means that a separate annealing section and a separate graphene deposition section is required in the line. In FIG. 7 the heat soak section 4 will have to be divided into an annealing section 4*a* and a graphene deposition section 4*b*. It that case it is preferable to deposit the graphene after the annealing of the substrate.

The method according to the invention can be executed in a continuous graphene deposition device comprising an uncoiler 1 for uncoiling (e.g.) a strip of Ni-plated steel M, a heating section 2 for rapid heating of the strip, a heat soak section 4 where the graphene pre-cursor is supplied through an inlet 8 and the where graphene layer is deposited in a controlled (non-oxidising, reducing or inert) atmosphere at the heat soak temperature, a cooling section 6 for cooling the graphene coated Ni-plated steel strip and a coiler 7 for coiling the strip. The temperature is monitored by means of temperature measurements 3 and 5. Instead of the uncoiler 1 and/or coiler 7 the device may be directly connected to a pre-processing process, such as Ni-plating, or a post-processing process such as slitting or cutting. The graphene precursor that is used may be supplied in liquid form at room temperature. Before introducing the graphene precursor through inlet 8 the liquid graphene precursor is led through an evaporation device so that the graphene precursor is led into the device through inlet 8 in vapour form.

According to a second aspect a graphene coated Ni-plated steel strip or sheet produced by the method according to the invention is provided having a low interfacial contact resistance for application in a battery case wherein the sheet at least at the side of the strip or sheet corresponding with the inner surface of the battery case is provided with the graphene coating layer, preferably wherein the peak height ratio G/D>1 wherein D and G correspond to the peaks at in the Raman spectrum at around 1365 cm-1 and 1584 cm-1 respectively. Preferred embodiments are provided by the dependent claims. The graphene coated Ni-plated steel strip or sheet is produced by the method of the invention and has a low interfacial contact resistance for application in a battery case wherein the sheet at least at the side of the strip or sheet corresponding with the inner surface of the battery case is provided with the graphene coating layer, preferably wherein the peak height ratio G/D>1 wherein D and G correspond to the peaks at in the Raman spectrum at around 1365 $cm^{-1}$ and 1584 $cm^{-1}$ respectively.

The invention also comprises a Ni-plated steel strip or sheet for a battery case wherein the strip or sheet at least at the side of the sheet corresponding with the inner surface of the battery case is provided with a graphene coating layer. It is preferred to have the graphene coating on both the sides of the Ni-plated steel strip or sheet as the lubrication provided from the graphene layer on both the sides of the sheet help in the deep drawing process during the forming of the battery case. Additionally, the graphene coating on both sides also helps to improve the performance of the nickel-plated steel casing, i.e. current collector electrode of primary battery.

Preferably the G/D peak ratio is at least 1, more preferably at least 1.5 and even more preferably at least 2. The 2D/G peak ratio is at least 0.20, and preferably at least 0.30.

In an embodiment a graphene coated Ni-plated steel strip or sheet is provided wherein the interfacial contact resistance is at most 20 $m\Omega \cdot cm^2$ when measured at a pressure P of 1.37 MPa (200 psi) according to the method herein below. Preferably the interfacial contact resistance is at most 10 and more preferably at most 6 $m\Omega \cdot cm^{-2}$, even more preferably the interfacial contact resistance is at most 5 $m\Omega \cdot cm^2$ and most preferably at most 4 $m\Omega \cdot cm^2$. Since forming a battery case from this graphene coated Ni-plated steel strip was seen to result in an increase in ICR it is important that the ICR of the undeformed graphene coated Ni-plated steel strip is as low as possible. Careful control of the deposition process and the process parameters within the ranges described herein result in reproducible and low ICR values of the graphene coated Ni-plated steel strip.

In an embodiment a graphene coated Ni-plated steel strip or sheet is provided for application in a battery case, wherein the Ni-plated steel sheet or strip is provided on the side of the sheet corresponding with i). the inner surface of the battery case with a Ni-plating layer and the graphene coating layer and ii). on the opposite side with a Ni-plating layer.

Optionally the Ni-plating layer that corresponds with the inner surface of the battery case is provided with a Co coating layer on top of the Ni-plating layer.

According to a third aspect the invention is also embodied in the use of the graphene coated Ni-plated steel strip or sheet according to the invention for manufacturing a battery case in a drawing operation, said operation comprising the steps of cutting plates or discs from the steel sheet or strip and performing a drawing operation on the plates or discs wherein the interfacial contact resistance of the battery case wall (i.e. after forming the battery case) is at most 20 $m\Omega \cdot cm^2$ when measured at a pressure P of 1.37 MPa (200 psi) according to the method described in the description. It is noted that the increase of the ICR of the graphene coated Ni-plated steel strip is caused by the deformation of the strip during the deep-drawing and wall-ironing of the battery can. Preferably the interfacial contact is at most 15, more preferably at most 10 mΩ·cm$^{-2}$. By means of comparison, if the same battery can was made of the Ni-plated steel sheet without graphene then an increase in ICR was observed from 8.2 mΩ·cm$^2$ for the base material and 92 mΩ·cm$^2$ for the material after battery can making. So not only does the starting flat Ni-coated steel sheet or strip have a much lower ICR (4.0 mΩ·cm$^2$ for the graphene coated Ni-plated steel strip compared to 8.2 mΩ·cm$^2$ for the uncoated Ni-plated steel strip) when provided with the graphene coating, but the increase in the ICR of the coating after battery can making shows a relatively lower increase in ICR for the graphene coated material as well (9.2 mΩ·cm$^2$ for the Ni-plated and graphene coated substrate compared to 92 mΩ·cm$^2$ for the uncoated Ni-plated steel strip).

The thickness of the steel sheet or strip used for the battery can is in the range of 0.10-1.00 mm, preferably 0.10 to 0.80 mm and the Ni-plating layer is applied with a thickness in the range of 0.1-50 μm. The nickel-plated steel sheet or strip can have a full hard microstructure (i.e. after cold rolling and before annealing or tempering) or an annealed (i.e. recrystallised) or tempered (i.e. recovered) microstructure.

EXAMPLES

In order to ascertain the suitability of a carbon containing compound as a graphene precursor dedicated experiments were performed to assess whether or not the use of a certain compound resulted in the deposition of a graphene layer on a nickel coated steel substrate.

For the experiments, a small temperature and atmosphere controlled furnace was used with an oxygen level below 10 ppm. Samples sufficiently large to allow production of AA battery cans were produced. The heat soak temperature was selected at values between 650 and 800° C. A fixed sequence of heating and flushing was used before the samples were introduced in the heated zone and exposed to the pre-cursor gas. The flushing gas is 100 vol. % Nitrogen. The furnace was set at the right temperature and allowed to stabilize at the set temperature during which a nitrogen flow was introduced in the furnace. The Ni-plated steel sample was introduced in the heating zone and allowed to heat up to the heat soaking temperature. After reaching that temperature the graphene pre-cursor was introduced in the furnace. After a specific time the graphene pre-cursor was purged from the furnace by nitrogen and the sample was cooled, the furnace opened and the sample taken out. Pressure in the furnace was just above atmospheric to assure a flow outwards, preventing oxygen diffusion inwards.

The effectiveness of the carbon containing compound to produce a graphene layer was determined by means of Raman spectroscopy. Raman spectroscopy is a widely used characterisation technique to determine the presence of graphene. The most common peak in the spectrum are the D band around 1365 cm$^{-1}$, G band at 1584 cm$^{-1}$ and 2D band around 2700 cm$^{-1}$. Generally a low D band signifies lower disorder in the sp2 hybridized carbon crystal structure. G band is always observed in graphitic carbons (any sp2 carbon) and 2D band for graphene is symmetric about the centre of the peak compared to that of graphite. The growth process was optimised for a low D peak as indicated in a typical Raman spectrum shown below in FIG. 1. In literature studies have been performed to categorise the different morphologies of carbon depositions on substrates. A systematic study was reported in "Triturating Triturating versatile carbon materials as saturable absorptive nano powders for ultrafast pulsating of erbium-doped fiber lasers" by Hsin, Lin Yang and Lin (Optical Materials Express, February 2015, pp. 236-253). A summary of their findings is presented in FIG. 2. This figure allows to quickly determine the nature of the carbon deposit.

A typical Graphene Raman spectrum has a strong G, 2D band and a minimal D band see FIG. 1. The width of the G peak reflects the number of graphene layers. The peak height ratios G/D and 2D/G were used to semi-quantify the quality of the coating with respect to graphene formation. In case 2D/G is 1, a single layer graphene is present, G/D should be preferably above 1.

From a great number of different compounds carbon containing compound the Raman spectrum after a deposition at a temperature of 715° C. for a duration of 3 minutes were assessed. The gaseous compounds were introduced into the heat soak section as such. For the liquid compounds use was made of a wash bottle in which the liquid carbon containing compound was placed, and wherein the vapour above the liquid was led to the heat soak section by a flow of nitrogen which was mixed with HNX before introduction into the heat soak section. Graphene deposition times were 5, 10 20 or 30 seconds.

The inventors found that the gaseous compounds methane and ethylene did not produce any Raman signal indicative of graphene. On the other hand the vapours of the liquid compounds propa-2-one, buta-2-one and ethyl acetate produced a strong signal indicative of graphene, and n-butanol, di-ethyl ether, hexane and N—N-dimethyl acetamide produced a strong D and G peak, but no significant 2D and 2G peak and were thus judged unsuitable to produce graphene on the substrate.

Figure 6:
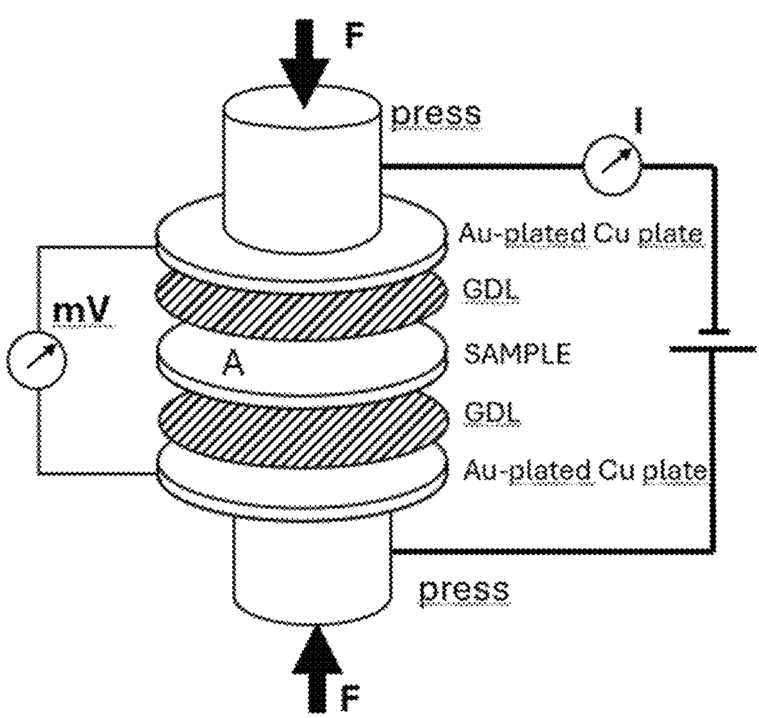

As a proof of concept (PoC) a 773 mm wide industrial coil was produced with a thickness of 0.25 mm with a 1.5 μm Ni on one side and 0.65 μm Ni on the other side of the strip in the continuous graphene deposition line depicted in FIG. 6. The heat soak temperature was 725° C. The graphene precursor was acetylene gas, and the concentration of the acetylene in the heat soak furnace was 2% (2% acetylene, 4% hydrogen, 94% nitrogen). The cooling water temperature was 40° C., and the cooling water was oxygen free to prevent oxidation of the graphene. The results were a G/D ratio between 2.2-3.3 and the 2D/G ratio between 0.37-0.46. Raman spectroscopy of samples taken along the width and the length of the strip shows a consistent deposition of graphene throughout. The deposition times during this PoC were between 0.1 and 4.0 s. Similar results could be obtained by using propa-2-one, buta-2-one and ethyl acetate as a graphene precursor, also at deposition times of at most 4.0 sec.

As the primary use of these graphene coated Ni-plated steel strip is for batteries, although other applications may be contemplated, the contact resistance is important.

To determine the contact resistance circular blanks of the graphene coated Ni-plated steel strip were processed by a forming operation (deep drawing and wall ironing) into battery cans as shown in FIG. 4. These cans were subsequently cut open and flattened to study the adherence of the graphene coating to the substrate during the forming operation.

Figure 5:
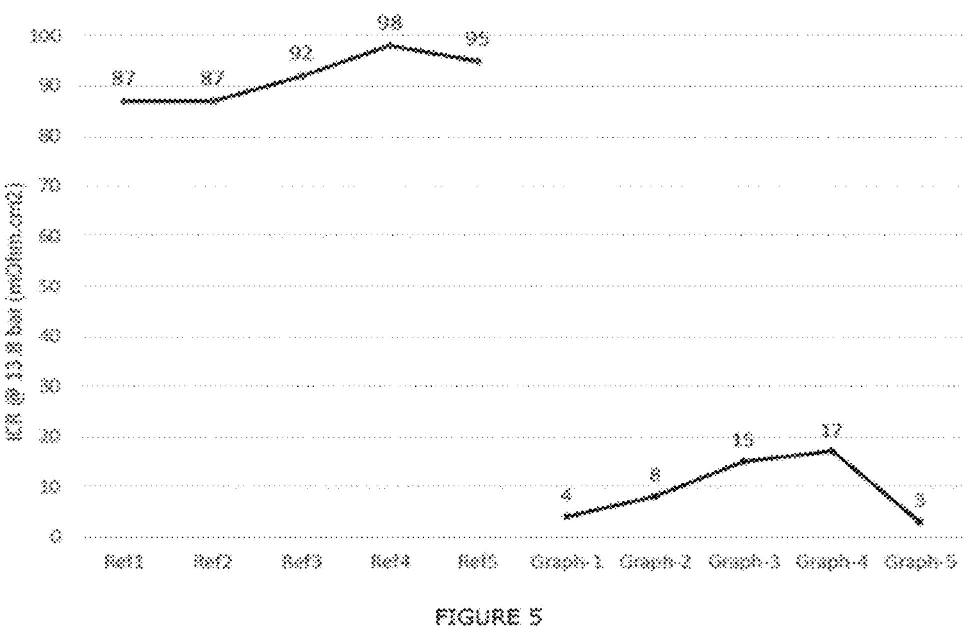

In FIG. 5 the contact resistance is shown of a Ni-plated reference steel strip and of the graphene coated Ni-plated steel strip. The values decrease from over 80 mΩ·cm$^2$ for the uncoated Ni-plated steel strip to below 20 mΩ·cm$^2$ for the graphene coated Ni-plated steel strip.

FIG. 6 shows the set-up of for the measurements of the interfacial contact resistance. This set-up is used also in measurements of the total electrical DC resistance, thus including interfacial contact resistance, of fuel cell stacks (Properties of Molded Graphite Bi-Polar Plates for PEM Fuel Cell Stacks, F. Barbir, J. Braun and J. Neutzler, Journal of New Materials for Electrochemical Systems 2, 197-200 (1999)). The interfacial contact resistance (ICR) test is based on Ohm's law, R=V/I, where R is the resistance in Ohms, V is the potential difference in Volts and I is the current in Amperes. A current of 10 Amperes is led through the sample, and the potential is measured, and this potential can then be used to calculate the resistance over the surface area of the sample. As backing plate a gas diffusion layer (GDL) is used on both sides of the sample (A). For the tests presented below Toray Paper TGP-H-120 was used as GDL. This is a carbon fibre composite paper suitable for use as a catalyst backing layer. It has a total thickness of 370 um (microns). By first placing the sample between two GDLs and then placing the GDL and sample between the two gold-plated copper pressure plates, the potential can be measured at certain pressure, the amount of pressure being applied to the sample is dependant of the size of the sample, for each new pressure value a 30 second interval is used before the current is determined. The dimensions of the gold-plated copper pressure plates is irrelevant because a pressure is imposed on the sample, but for the tests in this invention rectangular plates of 4×4 $cm^2$ or 2×2.5 $cm^2$ plates. The reference value of the pressure P is 200 psi (=13.8 bar, or 1.37 MPa). Prior to the testing of any sample A, several measurements were conducted with only two GDLs and no sample present, the average value of these measurement is then subtracted from the measurement done with the sample so that what remains is the ICR value of only the sample.

FIG. 7 shows a schematic lay-out for a continuous graphene deposition device comprising an uncoiler 1 for uncoiling (e.g.) a strip of Ni-plated steel M, a heating section 2 for heating the strip, a heat soak section 4 where the graphene pre-cursor is supplied through an inlet 8 and the graphene layer is deposited in a controlled (non-oxidising, reducing or inert) atmosphere at the heat soak temperature, a cooling section 6 for cooling the graphene coated Ni-plated steel strip and a coiler 7 for coiling the strip. The temperature is monitored by means of temperature measurements 3 and 5. Instead of the uncoiler 1 and/or coiler 7 the device may be directly connected to a pre-processing process, such as Ni-plating, or a post-processing process such as slitting or cutting.

FIGURES

The invention is further explained by means of the following, non-limitative figures.

FIG. 1 (a) shows a typical Raman spectrum of a few layers of graphene on Hilumin®, a proprietary Ni-plated steel substrate produced by Hille&Müller GmbH. FIG. 1 (b) shows a mono-atomic graphene layer.

FIG. 2 (a) The Raman scattering spectra and (b) the XRD spectra of few-layers of graphene, graphite nano-particle, graphene oxide nano-particle, carbon black nano-particle and charcoal nano-particle, taken from "Triturating versatile carbon materials as saturable absorptive nano powders for ultrafast pulsating of erbium-doped fiber lasers" by Hsin, Lin Yang and Lin (Optical Materials Express, Febr. 2015, pp. 236-253).

FIG. 3 (a) Raman spectrum of propa-2-one deposited at 715° C.; (b) Raman spectrum of buta-2-one deposited at 715° C.; (c) Raman spectrum of ethyl acetate at 715° C.; (d) Raman spectrum of acetylene deposited at 715°. This figure shows the experimental results of graphene deposition trials with various graphene pre-cursors as described in the experimental section. The experiments revealed good and well adhering graphene layers.

FIG. 4 Forming of battery cans. Some of the battery cans were cut open and flattened and subjected to both contact resistance measurement and Raman spectroscopy. These experiments revealed that the graphene deposition survives the forming operation and still results in a significant decrease of the ICR compared to uncoated Ni-plated substrates.

FIG. 5 Contact resistance measurements of a Ni-plated steel coil measured at 5 locations before (Ref. 1-5) and after graphene deposition (Graph. 1-5).

FIG. 6 Contact resistance measurements device.

FIG. 7 Device for continuous graphene deposition. Instead of the coiler and uncoiler a direct connection to the preceding or following installation/process step could be made. This preceding step could e.g. be a pickling line or cleaning line. The following step could e.g. a temper mill or tension levelling device. In case of a separate annealing section and a separate graphene deposition section the heat soak section 4 is divided into an annealing section 4*a* and a graphene deposition section 4*b*, which are preferably in that order: annealing first, graphene deposition after annealing.

The invention claimed is:

1. A method for manufacturing a steel strip for a battery case, wherein the method comprises:

providing a Ni-plated steel strip, and applying a graphene coating on one or both sides of the Ni-plated steel strip by a continuous roll-to-roll process, wherein the continuous roll-to-roll process is operated fully continuously by joining a leading edge of a coil of Ni-plated steel strip to a trailing edge of the preceding coil of Ni-plated steel strip in a joining section before entering the step of fast heating of the Ni-plated steel strip and separating the Ni-plated steel strip after cooling the graphene coated Ni-plated steel strip to produce coils of graphene coated Ni-plated steel strips, comprising the following consecutive steps:

fast heating at a heating rate of at least 50° C./s, of the Ni-plated steel strip in an inert, non-oxidising or reducing atmosphere in a heating section to a heat soak temperature of between 400 to 850° C.;

holding the Ni-plated steel strip in the heat soak section at the heat soak temperature;

projecting an inert, non-oxidising or reducing gas carrier comprising a graphene precursor on the heated Ni-plated steel strip in the heat soak section to produce an adhering graphene coating layer on the Ni-plated steel strip wherein the deposition growth time for the graphene coating layer is in the range of 0.10 seconds to 60 seconds;

cooling the graphene coated Ni-plated steel strip in a cooling section wherein the cooling medium is inert or reducing with respect to graphene;

post-processing the graphene coated Ni-plated steel strip.

2. The method according to claim 1, wherein the heating rate is at least 100° C./s.

3. The method according to claim 1, wherein the graphene coating layer on the graphene coated Ni-plated steel strip sheet has a peak height ratio G/D>1 wherein D and G correspond to the peaks at in the Raman spectrum at around 1365 cm−1 and 1584 cm−1 respectively.

4. The method according to claim 1, wherein the graphene precursor is one or more gases from the group of acetylene, propa-2-one, buta-2-one and ethyl acetate gas or vapour.

5. The method according to claim 1, wherein the Ni-plated steel sheet or strip is heated to the heat soak temperature of between 500 to 750° C.

6. The method according to claim 1, wherein the inert, non-oxidising or reducing gas carrier comprises hydrogen in the range of 1.0% to 5.0% hydrogen.

7. The method according to claim 1, wherein the inert, non-oxidising or reducing gas comprises nitrogen.

8. The method according to claim 1, wherein the graphene precursor is acetylene wherein the concentration levels of acetylene in the precursor gas is in the range of 0.05% to 2.5% acetylene, or the graphene precursor is propa-2-one wherein the concentration levels of propa-2-one in the precursor gas is between 0.05 to 1 times the maximum vapour pressure of propa-2-one at ambient temperature, or the graphene precursor is buta-2-one wherein the concentration levels of buta-2-one in the precursor gas is between 0.05 to 1 times the maximum vapour pressure of buta-2-one at ambient temperature, or the graphene precursor is ethyl acetate wherein the concentration levels of ethyl acetate in the precursor gas is between 0.05 to 1 times the maximum vapour pressure of ethyl acetate at ambient temperature.

9. The method according to claim 1, wherein the heat soak section is at operated at a near atmospheric pressure range of 0.7-2 bar.

10. The method according to claim 1, wherein the atmosphere in the heating section or in the heat soak section, or in the heating section and in the heat soak section is non-oxidising atmosphere.

11. The method according to claim 1, wherein the post-processing of the steel strip comprises one or more of the following steps:

Blowing excess fluid off the strip by an air-knife;

Drying the strip in air at a temperature of between 40 and 80° C.;

Temper rolling the strip;

Cutting the strip into sheets;

Stamping blanks from the strip or sheet;

Forming a battery case by deep drawing a blank stamped from the strip or sheet.

12. The method according to claim 1, wherein the Ni-plated steel sheet or strip is provided on the side of the sheet corresponding with the inner surface of the battery case with Ni plating layer and optionally a Co-plating layer on the Ni plating layer which is subsequently provided with the graphene coating layer, and a Ni plating layer on the side of the sheet corresponding with the outer surface of the battery case.

13. The method according to claim 1, wherein the deposition growth time is in the range of 0.10 to 4.0 seconds.

14. The method according to claim 1, wherein the graphene precursor is in a liquid state at room temperature and wherein the method comprises evaporation of the liquid graphene precursor before introducing the graphene precursor in the heat soak section.

15. A graphene coated Ni-plated steel strip or sheet produced by the method of claim 1 with a low interfacial contact resistance for application in a battery case wherein the sheet at least at the side of the strip or sheet corresponding with the inner surface of the battery case is provided with the graphene coating layer.

16. The graphene coated Ni-plated steel strip or sheet according to claim 15, wherein the interfacial contact resistance is below 20 mΩ·cm$^2$ when measured at a pressure P of 1.37 MPa (200 psi) according to the method described in the description.

17. The graphene coated Ni-plated steel strip or sheet according to claim 16, wherein the interfacial contact resistance is between 0.1-10 mΩ·cm$^2$.

18. The graphene coated Ni-plated steel strip or sheet according to claim 15 for application in a battery case, wherein the Ni-plated steel sheet or strip is provided on the side of the sheet corresponding with the inner surface of the battery case with a Ni-plating layer and the graphene coating layer and on the opposite side with a Ni-plating layer and optionally a Co-plating layer on the Ni-plating layer.

19. The graphene coated Ni-plated steel strip or sheet according to claim 15, wherein the Ni-plated steel strip consists of a full-hard steel substrate provided with a Ni-plating layer or a recrystallised steel substrate with a Ni-plating layer or a recrystallised steel substrate with a recrystallised Ni-plating layer.

20. A use of the graphene coated Ni-plated steel strip or sheet according to claim 15 for manufacturing a battery case in a drawing operation comprising the steps of cutting plates or discs from the graphene coated Ni-plated steel sheet or strip and performing a drawing operation on the plates or discs wherein interfacial contact resistance of the battery case wall is at most 20 mΩ·cm$^2$ when measured at a pressure P of 1.37 MPa (200 psi) according to the method described in the description.

* * * * *